Patented June 2, 1936

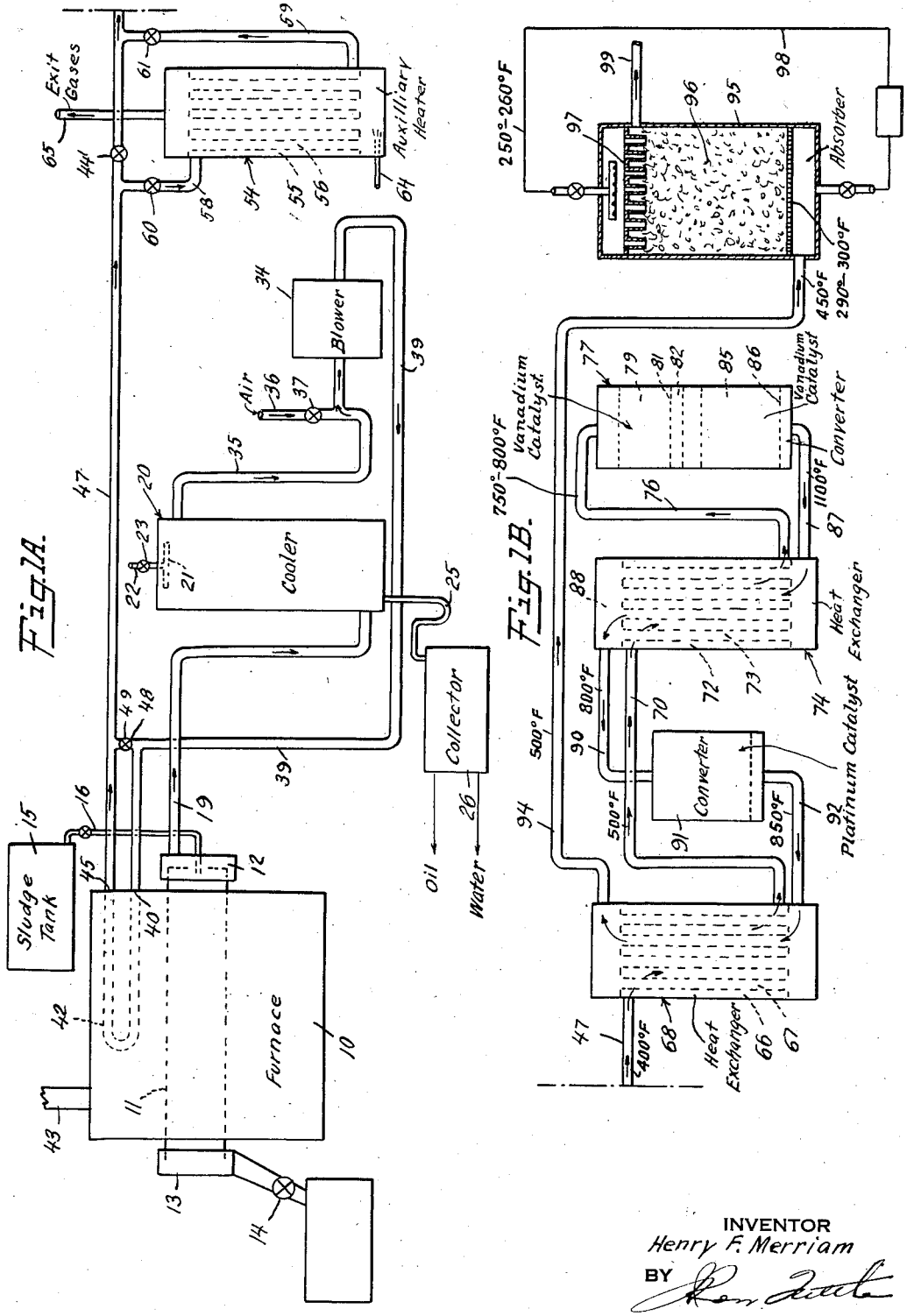

2,042,675

UNITED STATES PATENT OFFICE 2,042,675

MANUFACTURE OF SULPHURIC ACID

Henry F. Merriam, West Orange, N. J., assignor to General Chemical Company, New York, N. Y., a corporation of New York Application July 23, 1932, Serial No. 624,178

16 Claims. (Cl. 23—175)

This invention relates to the production of sulphuric anhydride from gas mixtures containing sulphur dioxide and oxygen by the contact process, and to the manufacture of sulphuric acid. The invention is more specifically directed to the catalytic oxidation of sulphur dioxide gas mixtures containing organic impurities, particularly to the catalytic oxidation of such gas mixtures obtained by the decomposition of sulphuric acid sludges constituting waste products of numerous oil refining processes.

Catalytic oxidation of sulphur dioxide to form sulphuric anhydride is well known in the art. In this art it has been recognized that the activity of certain catalytic materials, such as platinum, is deleteriously affected by organic impurities such as hydrocarbons contained in the gases with the result that the catalytic efficiency and/or the useful life of such catalysts is materially shortened.

The principal object of the present invention lies in the provision of a method for the catalytic oxidation of sulphur dioxide in gas mixtures containing organic impurities in accordance with which catalytic materials, such as platinum, adversely affected by organic matter, may be employed in the converter system without the necessity of first subjecting the gas to extensive purification for the purpose of eliminating organic impurities from the gas mixture. It is another object of the invention to provide a convenient and economical method for the catalytic conversion to sulphuric anhydride of sulphur dioxide gas mixtures obtained from the decomposition of acid sludges which, because of the source thereof, contain appreciable quantities of organic impurities and moisture.

Broadly considered, the invention comprises the provision of a catalytic conversion operation carried out in two stages. The invention contemplates utilization in the first stage of a catalyst not deleteriously affected by organic impurities, and in the second stage, a catalyst, such as platinum, which is susceptible to poisoning by organic matter. The conversion operation is conducted in a manner so that in the first stage, the conversion of sulphur dioxide to sulphur trioxide is well initiated, and the resulting temperature conditions are such that organic impurities carried in the gas stream are substantially completely converted to a form not interfering with the catalytic activity of platinum. The gases are then contacted with a platinum catalyst, and oxidation of sulphur dioxide to sulphur trioxide is rapidly completed. Although the broader aspects of the invention are directed to the catalytic oxidation of sulphur dioxide gases containing organic impurities regardless of the source of such gases, the invention particularly comprehends a process for the production of sulphuric acid from sulphuric acid sludge gases. With the latter in view, the invention involves initially the decomposition of acid sludges to produce a gas mixture containing principally sulphur dioxide and water vapor, together with smaller quantities of hydrocarbons and other gaseous impurities, followed by cooling of the gas stream to remove therefrom the bulk of the condensable vapors. The cooled gas mixture, containing appreciable quantities of volatile organic impurities and water vapor, is passed, unpurified and undried, after suitable preheating, directly to the converter system in which oxidation of sulphur dioxide is effected in the two-stage conversion operation above noted. Because of the comparatively high water content of the gas stream entering the converter system, the water and/or sulphuric acid content of the converted gas mixture is relatively increased. Hence, in the preferred embodiment of the invention, preheating of the cool incoming gas stream to reactive temperatures by waste heat in the entire system, and ultimate absorption of sulphur trioxide to form sulphuric acid are conducted in accordance with particular hereinafter described methods to prevent condensation of sulphuric acid in the heat transferrers and to procure efficient absorption of sulphuric anhydride.

A further understanding of the objects and advantages of the invention may be had from a consideration of the following detailed description taken in connection with the accompanying drawing showing diagrammatically one form of apparatus for carrying out a preferred embodiment of the process constituting the invention. Fig. 1—B is an extension of Fig. 1—A.

Referring to the drawing, the reference numeral 10 indicates the combustion chamber of a furnace adapted to burn coal, coke, oil, natural gas or other fuel. Mounted in the combustion chamber 10 is a decomposing kiln or retort 11 of any suitable known construction and provided with suitable mechanism such as a screw conveyor (not shown) to facilitate discharge of coke therefrom. The specific construction of the furnace constitutes no part of the present invention except that one preferred embodiment of the improved process contemplates the use of an externally heated kiln constructed so as to substantially exclude air therefrom.

One end of the kiln 11 is provided with a gas outlet conduit 19. The opposite end of the kiln projects into a header 13 into which the solid residue of the decomposition of the sludge is continuously discharged. The drum 13 is provided with an air-lock 14 through which coke may be withdrawn without admitting air to the kiln. Acid sludge is run into the kiln from a supply tank 15 through a valve-controlled pipe 16, the lower end of which projects into the end of the kiln.

The gas outlet conduit 19 opens into the bottom of a spray cooling tower 20 provided at the top with a spray head 21 connected to a cooling liquid inlet 22 controlled by valve 23. Cooling liquid and condensate run out of tower 20 through pipe 25 into the collector 26. Cooled uncondensed gases are withdrawn from the upper end of tower 20 by the blower 34 through conduit 35 into which opens an air inlet connection 36 controlled by a valve 37.

The outlet side of the blower 34 is connected through a conduit 39 with the inlet connection 40 of a heat exchanger, indicated diagrammatically at 42, mounted in the combustion chamber of the furnace 10 above the kiln 11 so that gas flowing through the heating coil may be heated by combustion gases of the furnace on their way to the discharge stack 43. The outlet connection 45 of heater 42 communicates with one end of the gas main 47. A by-pass 48 having a control valve 49 connects conduits 39 and 47.

If it is not desired to so construct the furnace as to include a heater such as the exchanger 42 shown on the drawing, provision may be made for raising the temperature of the gases in the main 47 by passing the gas stream or a portion thereof through an auxiliary heater 54. The chamber 55, surrounding the heating tubes 56, is connected to the main 47 through pipes 58 and 59 controlled by valves 60 and 61. The combustion chamber 63 of the heater is equipped with an oil or gas burner 64. Spent combustion gases are discharged from the heater through the stack 65.

As indicated in Fig. 1—B, the outlet end of gas main 47 opens into chamber 66 surrounding the tubes 67 in the heat exchanger 68, and chamber 66 connects through pipe 70 with the chamber 72 enveloping transferrer tubes 73 of the heat exchanger 74. The gases are discharged from chamber 72 through conduit 76 into a converter indicated generally by the reference numeral 77.

Converter 77 is preferably constructed to provide for two stages of conversion therein. One body of catalytic material 79 rests on a perforated plate 81. The second body of catalytic material 85 is supported by a perforated plate 86 near the bottom of the converter shell.

Hot partially oxidized gases are discharged from the converter into the heat exchanger 74 through pipe connection 87, and flow upwardly through tubes 73 into the outlet vestibule 88 from which the cooled gases pass through pipe 90 into a one-stage converter 91. The wholly converted gases then flow from the converter through pipe 92, rise upwardly in tubes 67 of the heat exchanger 68, and are discharged therefrom into the gas main 94 which conducts the gas stream into the lower end of an absorber 95. The latter is of a construction usually employed in the manufacture of sulphuric acid, and includes a body of packing 96 and a plate 97 for distributing absorbing acid over the packing.

Reference numeral 98 indicates generally a system for cooling and circulating acid through the absorber and for withdrawing product acid from the system.

One preferred embodiment of the process of the invention may be carried out substantially as follows. The burners in the furnace 10 are so adjusted as to maintain within the kiln 11 a temperature of preferably not substantially less than 400° F., and generally between 400 and 600° F. Acid sludge obtained from the refining of oils, such as petroleum, and containing for example 45% sulphuric acid, 20% liquid hydrocarbons, and 35% water, is continuously fed into the kiln from the supply tank 15 through the pipe connection 16. The sludge is decomposed in the kiln by the action of the heat, and substantially all the sulphuric acid contained in the sludge is reduced to sulphur dioxide by the hydrogen of the hydrocarbons and/or by the carbonaceous matter contained in the sludge, according to the nature of the latter. The rate of feed of sludge to the kiln and the rate of rotation of the conveyor in the kiln are so adjusted that substantially all of the sulphuric acid is reduced during the passage of the sludge through the kiln, and sulphur dioxide is produced. Coke may be continuously discharged from the kiln into the drum 13.

The gases resulting from the decomposition of the sludge in the kiln contain principally sulphur dioxide and water vapor, and smaller quantities of hydrocarbons, carbon dioxide, carbon monoxide, nitrogen and oxygen. As previously noted, according to the preferred embodiment of the process, the decomposition of the sludge is effected in the kiln substantially in the absence of air. Hence, burning of carbonaceous matter of the sludge is substantially prevented, and the gas produced in the kiln is a sulphur dioxide gas mixture which may contain, for example, about 10–15% sulphur dioxide and smaller quantities of volatile organic matter and carbon dioxide, the remainder being largely water.

The hot gaseous products from the kiln at temperatures generally around 500–600° F. are introduced through pipe 19 into the bottom of the cooling tower 20. The gas stream rises through the tower and is intimately contacted with the downwardly flowing spray of water or other cooling liquid introduced through pipe 22. The rate of flow of water through the tower is controlled by valve 23 so that the gas, on leaving the top of the tower through conduit 35, is cooled to about 100° F., whereby the bulk of the water vapor and a large portion of the condensable hydrocarbons are condensed and separated from the gas stream. The cooling liquid and included condensate runs out of tower 20 through pipe 25 at temperatures of about 160° F., at which temperature a minimum quantity of sulphur dioxide becomes dissolved in the liquid. Oils may be separated from the water in collector 26.

It is to be noted that at this point in the system after condensation of water and condensable hydrocarbons, the sulphur dioxide concentration of the gas stream is high and may be as much as 75–99% by volume. Further, the gas stream in this particular embodiment of the invention is substantially free of oxygen. Hence, where the gases are to be utilized for conversion to sulphur trioxide, valve 37 is opened and regulated so as to permit sufficient diluting air to be drawn into the system through the inlet 36 by the blower 34 to provide in the gas stream the amount of oxygen required for oxidation in the converters of sulphur dioxide and organic impurities as will hereinafter more fully appear. In other words, the composition of the gas mixture is preferably so adjusted as to include therein the quantity of oxygen necessary for conversion of the sulphur dioxide to sulphur trioxide plus sufficient oxygen to facilitate oxidation of organic impurities in the gas stream.

The gas stream in the pipe connection 35 contains appreciable quantities of water vapor and volatile organic compounds. In the manufacture of sulphuric anhydride utilizing sulphur dioxide gases containing no organic impurities, the usual procedure would be to dry the gases before introduction into the converter system by passing the gas stream through the usual drying towers in which sulphuric acid is circulated. However, organic matter in the gas stream tends to discolor the drying acid and render it impure, and for this reason the gases may not be advantageously dried in this manner. Hence, according to one feature of the invention, the wet gases are passed directly into the converter system without drying.

The gas stream, at substantially normal temperatures and constituted as above noted, is pumped by blower 34 through conduit 39 to the inlet 40 in the heater 42 in the combustion chamber of furnace 10, the gas stream being heated by heat exchange with the hot furnace gases. Before introducing the gases into the heat exchanger 68 of the converter system, it is preferable to preheat the gases to about 400° F. to prevent condensation from the converted gases of sulphuric acid in the tubes 67 of the heat exchanger 68. Accordingly, the heater 42 is preferably of such size and construction as to permit heating the gas stream therein to temperatures not less than about 400° F., in which case the gases may be conducted directly through pipe main 47 into heat exchanger 68. If necessary, further temperature adjustment of the gases in line 47 may be had by admitting cool gases through by-pass 48, or by additional heating in auxiliary heater 54. In any event, the initial preheating is controlled preferably so as to raise the temperature of the gas stream in the main 47, at the point of introduction into heat exchanger 68, to not less than the condensation temperature of sulphuric acid corresponding to the moisture content of the exit gases of the converter system, e. g. 400° F.

The preheated gases are introduced into exchanger 68 and pass through chamber 66 in heat transfer relation with the gases rising through tubes 67 previously discharged from the converter 91. In passing through the heat exchanger 68, the temperature of the incoming gas stream is raised to about 500° F., the gases being then discharged through pipe 70 into the chamber 72 of heat exchanger 74. In the latter, the gases are further preheated, so that on introduction into converter 77, the temperature of the gas stream at the inlet is about 750–800° F.

In the first stage of conversion in the converter 77, the invention contemplates the use of a non-platinum catalytic material not deleteriously affected by organic matter, such as vanadium catalysts, sulphated ilmenite, and iron oxides. These catalysts are characterized by the fact that the catalytically active metal constituents thereof are combined with oxygen and are present in the catalyst as oxide, sulphate or other metal-oxygen compound or mixture thereof (as distinguished from platinum which is used in the metallic form) and will be referred to hereinafter generically as metal-oxide catalysts. The conversion reaction is initiated in the catalytic material 79, preferably a vanadium catalyst such as described in U. S. Patent No. 1,371,004 of March 8, 1921 to Slama and Wolf, and considerable quantities of sulphur dioxide are oxidized to sulphur trioxide with accompanying evolution of heat. During this catalysis the organic compounds contained in the gases are oxidized to produce carbon dioxide and water. Under certain conditions, some of the sulphur trioxide initially formed may act to oxidize organic matter, the sulphur dioxide formed being subsequently reoxidized to sulphur trioxide. Accordingly, the result of the reaction effected in the catalytic material 79 is such as to partially convert sulphur dioxide to sulphur trioxide, and to substantially completely oxidize the organic compounds contained in the gas to a form not harmful to platinum. The gas stream then passes through filtering material 82, which retains any solid particles which may drop down from the body of catalytic material 79, and contacts with the platinum catalyst 85 in the lower end of the converter, oxidation of sulphur trioxide proceeding therein toward completion.

The partially oxidized gases from the converter 77, at temperatures of about 1100° F., enter tubes 73 of the heat exchanger 74, and are cooled therein, by heat transfer to the incoming gas stream in chamber 72, to about 800° F. The partially oxidized gases thus cooled down to approximately optimum conversion temperature are then introduced into the converter 91 containing a platinum catalyst, and the oxidation of sulphur dioxide to sulphur trioxide is completed.

The exit gases of the converter 91, at a temperature of about 850° F., pass through the tubes 67 in the heat exchanger 68, are cooled by heat interchange with the incoming gas stream to about 500° F. and are discharged into the gas main 94. It should be noted that the converted gas stream contains relatively large amounts of moisture and/or sulphuric acid because of the absence of a drying operation in the system, and due to combustion of organic compounds. Accordingly, to avoid condensation of sulphuric acid in the heat exchanger 68 or in the main 94, it will be seen that the temperature of the incoming gases on entering the heat exchanger through the inlet pipe 47 should be not less than the condensation temperature of sulphuric acid which corresponds to the moisture content of the converted gases which are conducted through lagged gas main 94 into the lower end of the absorber 95.

In accordance with the present invention it has been found that satisfactory absorption of sulphur trioxide from gases containing comparatively large quantities of sulphuric acid and/or moisture may be obtained by maintaining a comparatively high temperature in the acid circulated through the absorber. Further, the temperature of the gas stream entering the absorber should preferably be maintained not lower than about 450° F., and preferably around 600° F., to thereby avoid preliminary condensation of sulphuric acid from the moist sulphur trioxide gas. The gases entering the absorber 95 may, for example, contain 1 to 2 grams of water per cubic foot. In the preferred procedure, the absorbing acid at the point of first contact of acid and gas, i. e., at the base of the absorbing tower is not less than about 290° F., and preferably around 300° F. Furthermore, it has been found that particularly good results may be obtained where the absorbing acid, during the entire period of contact of acid and gas, is maintained at temperatures not less than about 250° F. Hence, 98% sulphuric acid, for example, is fed into the upper end of the absorber at temperatures of about 250–260° F. The quantity of acid passed through the absorber and period of contact of acid are so regulated that the temperature of acid, running downwardly over the packing in contact with the upwardly flowing gas stream, rises about 40–50° F., so that the temperature of the acid in the lower section of the packing is not less than about 290–300° F.

Exit gases leave the apparatus through the discharge pipe 99, and product acid is withdrawn from the circulating system 98 in the known manner.

Hence, according to this phase of the invention, efficient absorption of sulphur trioxide and sulphuric acid from gases containing comparatively large quantities of sulphuric acid and/or water may be effected by maintaining the temperature of the absorbing acid relatively high as above noted. This discovery permits the utilization in the contact process, without drying, of sulphur dioxide gases containing comparatively large quantities of moisture, and this aspect of the invention is applicable, of course, to all wet sulphur dioxide gases irrespective of source. In the present process, however, this feature of the invention is of considerable importance since, because of the organic impurities in the gases drying thereof in the usual manner with sulphuric acid before conversion is undesirable and uneconomical as previously noted, the gases may be introduced directly into the converter system without drying, and satisfactory absorption of the converted gases ultimately obtained notwithstanding the high moisture content of the gas stream entering the converters.

I claim:

1. The process of catalytically oxidizing sulphur dioxide to sulphur trioxide which comprises contacting a gas mixture heated to a reactive temperature and containing sulphur dioxide, oxygen and organic impurities with a catalyst unaffected by organic impurities to oxidize sulphur dioxide to sulphur trioxide and convert organic impurities to non-deleterious form, and then contacting the gas mixture with a catalyst susceptible to poisoning by organic impurities.

2. The process of catalytically oxidizing sulphur dioxide to sulphur trioxide which comprises contacting a gas mixture heated to a reactive temperature and containing sulphur dioxide, oxygen and organic impurities with a catalyst unaffected by organic impurities to oxidize sulphur dioxide to sulphur trioxide and convert organic impurities to non-deleterious form, and then contacting the gas mixture with a platinum catalyst to complete oxidation of sulphur dioxide to sulphur trioxide.

3. The process of catalytically oxidizing sulphur dioxide to sulphur trioxide which comprises contacting a gas mixture heated to a reactive temperature and containing sulphur dioxide, oxygen and organic impurities with a vanadium catalyst to partially oxidize sulphur dioxide to sulphur trioxide and convert organic impurities to non-deleterious form, and then contacting the gas mixture with a platinum catalyst to complete oxidation of sulphur dioxide to sulphur trioxide.

4. The process of making sulphur trioxide from a gas mixture heated to a reactive temperature and containing sulphur dioxide, oxygen and organic impurities which comprises contacting the gas mixture with a vanadium catalyst to partially oxidize sulphur dioxide to sulphur trioxide and simultaneously burn organic impurities to non-deleterious form by heat generated in the reaction, and then contacting the gas mixture with a platinum catalyst to complete oxidation of sulphur dioxide to sulphur trioxide.

5. The process of making sulphur trioxide which comprises decomposing acid sludge to form a gas mixture containing sulphur dioxide and organic impurities, contacting the gas mixture containing the sulphur dioxide and organic impurities in admixture with oxygen with a catalyst unaffected by organic impurities to oxidize sulphur dioxide to sulphur trioxide and convert organic impurities to non-deleterious form, and then contacting the gas mixture with a catalyst susceptible to poisoning by organic impurities to complete oxidation of sulphur dioxide to sulphur trioxide.

6. The process of making sulphur trioxide which comprises decomposing acid sludge to form a gas mixture containing sulphur dioxide and organic impurities, contacting the gas mixture containing the sulphur dioxide and organic impurities in admixture with oxygen with a vanadium catalyst to partially oxidize sulphur dioxide to sulphur trioxide and convert organic impurities to non-deleterious form, and then contacting the gas mixture with a platinum catalyst to complete oxidation of sulphur dioxide to sulphur trioxide.

7. The process of making sulphur trioxide which comprises heating acid sludge to a temperature sufficient to decompose the sludge and form a gas mixture containing sulphur dioxide and organic impurities, cooling the gas mixture to separate condensable gases therefrom, heating a gas mixture containing the sulphur dioxide and uncondensed organic impurities in admixture with oxygen to a reactive temperature, contacting the gas mixture with a catalyst unaffected by organic impurities to partially oxidize sulphur dioxide to sulphur trioxide and convert organic impurities to a non-deleterious form, and then contacting the gas mixture with a platinum catalyst to complete oxidation of sulphur dioxide to sulphur trioxide.

8. The process of making sulphur trioxide which comprises heating acid sludge to a temperature sufficient to decompose the sludge and form an initial gas mixture containing sulphur dioxide and organic impurities, cooling the gas mixture to separate condensable gases therefrom, forming a gas mixture containing the sulphur dioxide, uncondensed organic impurities, and oxygen in excess of sufficient quantities to provide convertible proportions of sulphur dioxide and oxygen, contacting the gas mixture with a catalyst unaffected by organic impurities to partially oxidize sulphur dioxide to sulphur trioxide and convert organic impurities to non-deleterious form, and then contacting the gas mixture with a platinum catalyst to complete oxidation of sulphur dioxide to sulphur trioxide.

9. The method of making sulphur trioxide from a gas mixture containing sulphur dioxide, oxygen, organic impurities and moisture in a contact process involving a plurality of conversion stages which comprises heating the gas mixture to a temperature not less than the condensation temperature of sulphuric acid corresponding to the moisture content of the exit gases of the converter system, further heating the gas mixture to a temperature sufficient to initiate the conversion reaction by passing the gas mixture in heat exchange relation with gases undergoing conversion in the system, contacting the gas mixture in one stage of conversion with a catalyst unaffected by organic impurities and unaffected at reactive temperatures by moisture, to oxidize sulphur dioxide to sulphur trioxide and convert organic impurities to non-deleterious form, and then contacting the gas mixture with a platinum catalyst to complete oxidation of sulphur dioxide to sulphur trioxide.

10. The process of making sulphur trioxide by the contact process which comprises heating acid sludge to a temperature sufficient to decompose the sludge and form an initial gas mixture containing sulphur dioxide and organic impurities, cooling the gas mixture to separate condensable gases therefrom, forming a gas mixture containing the sulphur dioxide, uncondensed organic impurities, together with oxygen in excess of sufficient quantities to provide convertible proportions of sulphur dioxide and oxygen, partially preheating the gas mixture to reactive temperature by heat from the hot gases involved in the decomposition of the acid sludge, further preheating the gas mixture to reactive temperature by waste heat generated in the conversion reaaction, contacting the gas mixture with a catalyst unaffected by organic impurities to partially oxidize sulphur dioxide to sulphur trioxide and convert organic impurities to non-deleterious form, and then contacting the gas mixture with a platinum catalyst to complete oxidation of sulphur dioxide to sulphur trioxide.

11. The process of making sulphur trioxide by the contact process which comprises heating acid sludge to a temperature sufficient to decompose the sludge and form an initial gas mixture containing sulphur dioxide, organic impurities and water vapor, cooling the gas mixture to separate condensable gases therefrom, forming a gas mixture of sulphur dioxide, uncondensed organic impurities and water vapor, together with oxygen in excess of sufficient quantities to provide convertible proportions of sulphur dioxide and oxygen, heating the gas mixture before introduction thereof into the converter system to a temperature not less than the condensation temperature of sulphuric acid corresponding to the moisture content of the exit gases of the converter system, further heating the gas mixture to a temperature sufficient to initiate the conversion reaction by passing the gas mixture in heat exchange relation with gases undergoing conversion in the system, contacting the gas mixture in one stage of conversion with a vanadium catalyst to oxidize sulphur dioxide to sulphur trioxide and convert organic impurities to non-deleterious form, and then contacting the gas mixture with a platinum catalyst to complete oxidation of sulphur dioxide to sulphur trioxide.

12. The method of separating sulphuric anhydride from a gas stream containing the same, together with a substantial amount of water vapor, which comprises contacting the gas at an initial temperature not less than about 450° F. with absorbing acid and maintaining the acid throughout the period of contact of acid and gas at a temperature not less than about 250° F.

13. In the manufacture of sulphuric acid, the improvement which comprises contacting moist gases containing sulphur trioxide with sulphuric acid while maintaining the acid throughout the period of contact of acid and gas at temperatures not substantially less than 250° F. and not substantially in excess of 300° F.

14. In the manufacture of sulphuric acid involving the absorption of sulphur trioxide in sulphuric acid by passing a moist gas stream containing sulphur trioxide in countercurrent relation with a body of sulphuric acid, the improvement which comprises maintaining the acid at the point of first contact with the gas stream at temperatures not substantially less than about 290° F.

15. In the manufacture of sulphuric acid, the process which comprises contacting at reactive temperatures a moist gas mixture containing sulphur dioxide, oxygen and moisture with a catalyst, unaffected at reactive temperatures by moisture, to oxidize sulphur dioxide and form a gas mixture containing sulphur trioxide, and contacting the gas mixture with sulphuric acid while maintaining the acid at the point of first contact of acid and gas at temperatures not less than about 290° F.

16. In the manufacture of sulphuric acid, the improvement which comprises heating acid sludge to a temperature sufficient to decompose the acid sludge and form a gas mixture containing sulphur dioxide and water vapor, cooling the gas mixture to condense the bulk of the water vapor, heating the cooled gas mixture containing the sulphur dioxide and residual water vapor not condensed by said cooling in admixture with oxygen to reactive temperatures, contacting the gas with a catalyst, unaffected at reactive temperatures by water vapor, to oxidize sulphur dioxide and form a gas mixture containing sulphur trioxide and a substantial amount of water vapor, maintaining the temperature of the gas mixture not less than about 450° F., and contacting the gas mixture at an initial temperature of not less than 450° F. with absorbing acid to absorb sulphur trioxide.

HENRY F. MERRIAM.